US012176201B2

(12) United States Patent
Gesche et al.

(10) Patent No.: US 12,176,201 B2
(45) Date of Patent: Dec. 24, 2024

(54) PLASMA LIGHT ENGINE

(71) Applicants: Roland Gesche, Seligenstadt (DE); Sundarajan Mutialu, San Juan Capistrano, CA (US); Joachim Scherer, Karlstein (DE)

(72) Inventors: Roland Gesche, Seligenstadt (DE); Sundarajan Mutialu, San Juan Capistrano, CA (US); Joachim Scherer, Karlstein (DE)

(*) Notice: Subject to any disclaimer, the term of this patent is extended or adjusted under 35 U.S.C. 154(b) by 42 days.

(21) Appl. No.: 17/968,444

(22) Filed: Oct. 18, 2022

(65) Prior Publication Data

US 2023/0162968 A1 May 25, 2023

Related U.S. Application Data

(60) Provisional application No. 63/257,296, filed on Oct. 19, 2021.

(51) Int. Cl.
*H01J 65/04* (2006.01)
*H01J 61/32* (2006.01)

(52) U.S. Cl.
CPC .......... *H01J 65/044* (2013.01); *H01J 61/322* (2013.01); *H01J 2893/0063* (2013.01)

(58) Field of Classification Search
None
See application file for complete search history.

(56) References Cited

U.S. PATENT DOCUMENTS

| | | | | |
|---|---|---|---|---|
| 6,476,557 | B1 * | 11/2002 | Leng | H01J 61/12 315/39 |
| 9,214,329 | B2 * | 12/2015 | Calame | H01J 65/042 |
| 2014/0125225 | A1 * | 5/2014 | Calame | H01J 65/044 315/34 |

* cited by examiner

*Primary Examiner* — Monica C King

(57) ABSTRACT

A plasma light with at least one non-rotating light bulb is disclosed. The light includes a conducting cavity structure with a radiation source input port and a light bulb. The geometry of the cavity is designed to generate electrical fields with time-dependent geometrical designed orientation within parts of the light bulb, while the direction of the radiation fields from the radiation source port caused by a microwave generator to the input port fields is stationary.

35 Claims, 9 Drawing Sheets

PLASMA LIGHT ENGINE

CROSS-REFERENCE TO RELATED APPLICATION

This application claims priority to application Ser. No. 63/257,296 filed on Oct. 19, 2021 and entitled "Plasma Light Engine, which is incorporated herein by reference.

TECHNICAL FIELD

The present invention generally relates to the field of electrodeless gas-discharge lamps, and more particularly, is directed to a plasma light engine.

BACKGROUND

Plasma lights and lamps are known in the art and have their origins in the work of Nikola Tesla in the late 1800s. Tesla is considered by many as the inventor of the internal-electrodeless lamp based on his experiments and study of high voltage phenomena using high frequency currents in evacuated glass tubes for lighting.

The first attempt at a commercial embodiment of a plasma lamp is believed to be the sulfur lamps manufactured by Fusion Lighting. At the time, Fusion was in the business of manufacturing microwave powered ultraviolet industrial lighting systems. These so-called discharge lamps use electrodes, such as tungsten, to support an electric arc. However, care must be taken to not use material in the lamp that erodes the electrode or melt it at high temperature. Fusion sought to avoid these problems by eliminating the electrode altogether. Microwave energy from an external source was used to energized the lamp. This led to the development of Fusion's sulfur bulbs.

The Fusion bulbs had a number of practical problems that limited their commercial appeal. Reliability was a major concern became the bulb needed to be rotated at a very high rate of speed so that it could be uniformly heated. A stationary bulb would easily be punctured due to the buildup of heat in one location if it were not rotated. A fan was also needed for cooling. The fan and spin motor made for a noisy system and reduced energy efficiency of the total system.

Great strives have been made since Tesla first experimented with plasma lights and today, plasma lights are the highest quality full spectrum artificial sunlight known to man.

Prior art plasma lamps start operation at low pressure (mbar) with the ignition of a noble gas. Noble gasses create a plasma that heats the additional active substances which are in a solid state at room temperature, first, causing melting, then evaporation of those substances into a liquid then vapor and last to the fourth stage of matter plasma. This also increases the pressure in the light bulb up to a couple of atmospheres. The problem is that with the increasing pressure, the free path length of electrons inside the plasma shrinks which leads to local high-density plasma regions inside the light bulb.

As shown in FIG. 1, these high-density plasma regions form filamentary discharge streamers 1 inside the light bulb. The streamers follow the lines of the electrical field strength, ending at the (quartz) light bulb 2 where the field lines enter and leave light bulb 2.

On bulb 2 where streamers 1 terminate, the bulb material is exposed to high local thermal energy, causing damage and with a high probability causes the bulb to fail within seconds (with materials like sulfur) to a couple of hours (with other more complicated substances like used in the Class A).

To avoid this damage, the current state of the art solution is to introduce a time dependent variation between the geometric direction of the electrical field vector and the gas filling. The typical ways this is accomplished include the following:

(1) Holding the electrical field stationary and varying the plasma gas location, preferably in a rotational way. This leads to a rotating light bulb solution in a stationary field applicator as disclosed in publication No. WO 001 992 008 240. The drawback of this solution is the costly need of a physical motor drive, whose moving parts wear out reducing the lifetime of the total system and effectively causing early damage to catastrophic failure. Further, the fixed axis that drives the light bulb reduces the freedom of design of the microwave structure to optimize both light output and energy efficiency of the whole light engine.

(2) Another solution is to improve cooling of the bulb at the point of maximal normal electrical field strength together with and/or coming up with special mixtures of the bulb filling. These approaches are illustrated in U.S. Pat. No. 9,214,329 and in the '240 publication mentioned above. Utilizing very small bulbs, which reduces the microwave power used (U.S. Pat. No. 8,525,430; EP000001307899).

(3) A further solution is the possibility to keep the bulb stationary and generate circular polarized waves by two microwave sources or a mode converter. This solution is illustrated in U.S. Pat. No. 6,873,119. However, this solution requires bulky and expensive additional components. The mode converter requires very tight and quality microwave matching. This cannot be accurately achieved; the plasma impedance is strongly changing with pressure in the bulb, changing the impedance matching conditions for the microwave source, which has instabilities and requires very tight control, as well.

The above-described solutions make compromises with spectral quality of light and the efficiency and the overall light flux of the system. Thus, there is a need in the art for a plasma light engine in accordance with the present invention.

SUMMARY OF THE INVENTION

In summary, the present invention is the integration of: 1) a non-rotating bulb light engine; 2) specific customized mixtures of noble gasses and other elements which yield specific spectral range, quality and optimized spectrums for specific applications; and 3) a novel wave guide that optimizes: a. the efficiency, b. spectral output, c. light flux, d. reliability and robustness of the plasma light engine.

The primary objective of the present invention is to generate an electromagnetic field with changing geometrical direction of the electrical field vector inside a light bulb in a small, simple, reliable, and cost-efficient way. The invention makes use of the wave reflection characteristic of a conducting wall. The reflection at a conducting wall generates elliptic or circular polarization at some points in space.

The plasma light engine of the present invention, when integrated into a final lamp structure, has application in a number of applications, including, without limitation:

Agriculture, growing;

Film lamps;

Architectural lighting;

Traffic and airports lighting; and

Other industrial applications.

The above applications are by way of example only as the plasma light engine of the present invention may be integrated into a number of lamp structures.

BRIEF DESCRIPTION OF THE DRAWINGS

The novel features of the present invention will be understood more fully and clearly from the following detailed description of the invention as set forth in the accompanying drawings in which.

DESCRIPTION OF THE PREFERRED EMBODIMENT

A preferred embodiment of the present invention will now be described with reference to FIGS. 2-7.

Figure 1:
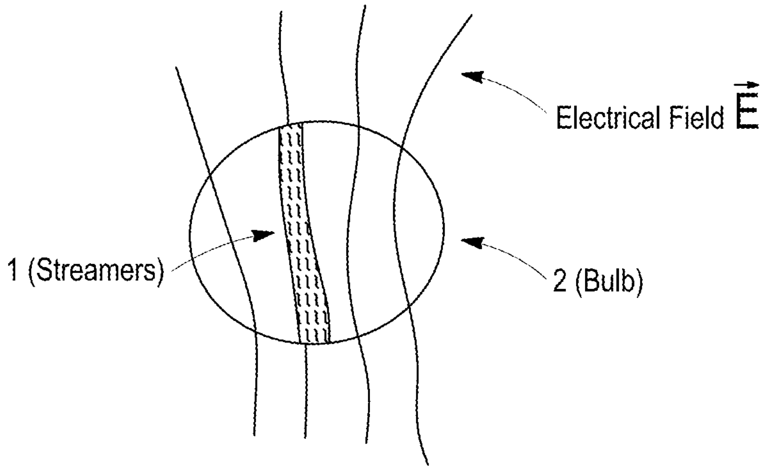
FIG. 1 illustrates a plasma lamp engine as known in the prior art.
Figure 2:
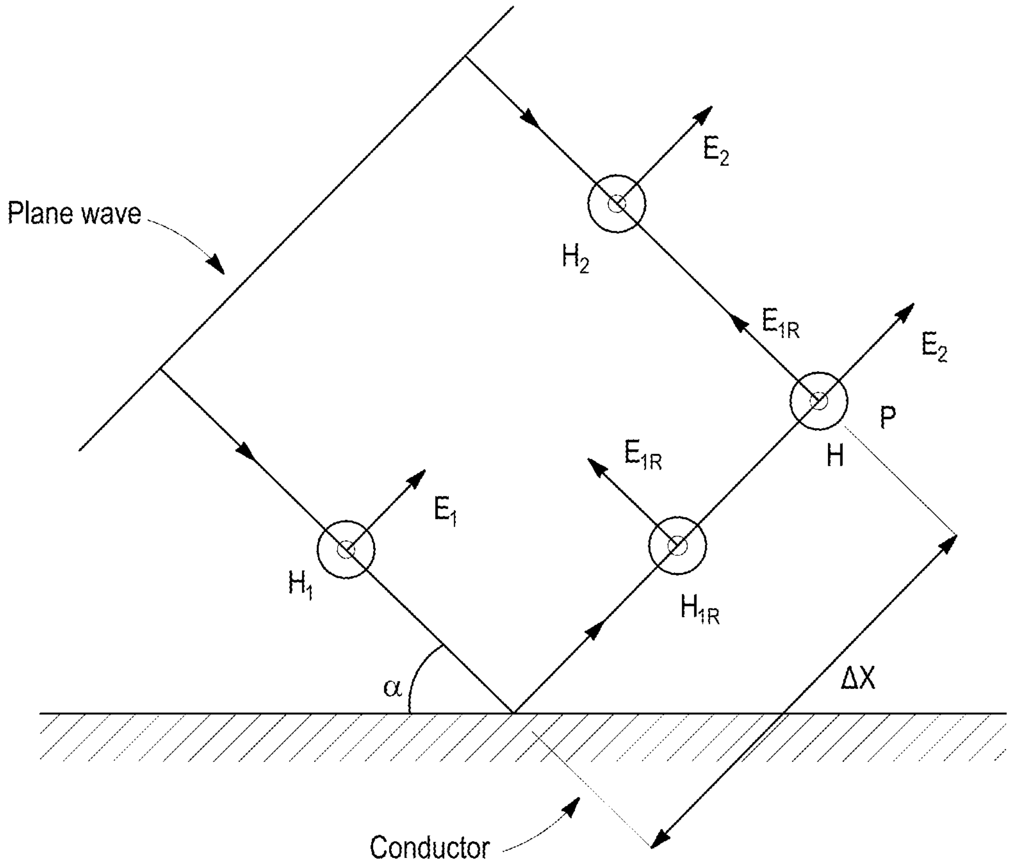
FIGS. 2-7 illustrate the operation of a plasma light engine in accordance with the present invention.

Referring to FIG. 2, a plane wave E1, H1, is propagating to a conducting plate under an angle α, the magnetic field component is parallel to the plate. The wave is reflected ($E_{1R}$, $H_{1R}$) and superposes with another part of the incoming plane wave $E_2$, $H_2$, $E_{1R}$ and $E_2$ are forming a geometrical angle which is 90° for α=45°.

Furthermore, there is a phase difference due to the longer travel of $E_{1R}$, Δx. If the additional path length Δx causes a phase shift of 90°, the electrical field at P is circular polarized losses omitted. This model is valid only in a far field and cannot be directly applied to the given lamp structures with dimensions in the wavelength region of the used microwave and the need of shielding of the microwave by an enclosed metallic region. But the principle can be applied to the present invention and light engine.

The new wave guide of the present invention uses a closed metallic cavity, which has a source port for incoming microwaves. This can be a coax port, a coupling loop, a waveguide port (rectangular, circular or elliptical), or a magnetron antenna. In this cavity a light bulb is placed, filled with a material composition for plasma lighting. The shape of the cavity and the positions of source port and light bulb are numerically optimized to generate a time-dependent variation of the electrical field strength inside the bulb. This too is part of the present invention.

The cavity needs to be conducting for microwaves and transparent for light at least over a major part of the cavity. This can be utilized by metallic mesh structures or by transparent materials coated with a conducting thin film, e. g. made from Indium-Tin-Oxide (ITO) or other similar material(s). Part of the cavity can be solid metallic and can be used as part of the reflector for the light engine. Furthermore, spectral filtering or infrared shielding can be realized by thin film layer structures or other structures around the infrared shielding.

Figure 3:
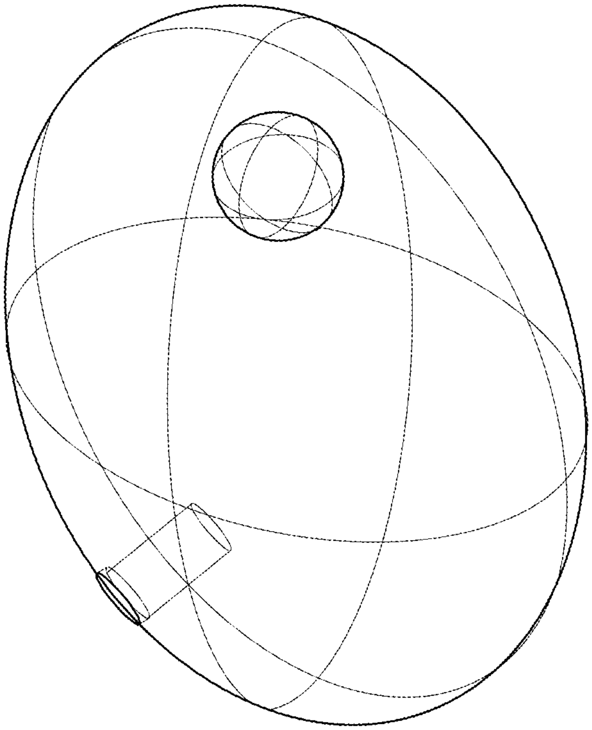
Figure 4:
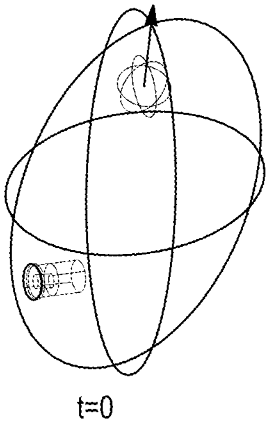
Figure 5:
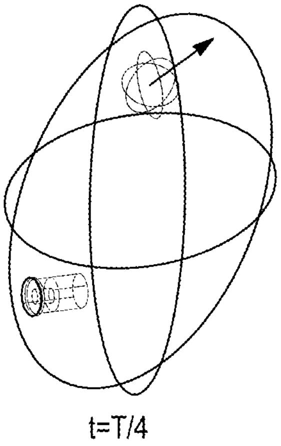
Figure 6:
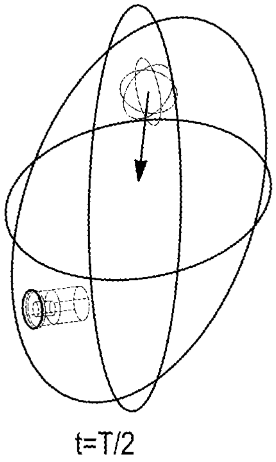
Figure 7:
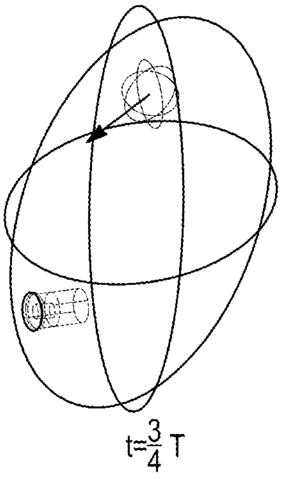

FIG. 3 illustrates an example realization of this part of the present invention, where the cavity is formed as an ellipsoid with different lengths of the three principal axes. Inside the conducting cavity, a circular light bulb is located, made of quartz with a plasma gas material recipe inside. Microwave energy is delivered by a magnetron power source located at the surface of the ellipsoid, tilted to the cartesian coordinates of the ellipsoid in two angular directions. Only the antenna part of the magnetron is shown in FIG. 3, the magnetron body is omitted for simplicity.

Electrical fields, power densities, and currents are calculated by electromagnetic simulation software. FIGS. 4-7 show the simulated electrical field vector at 4 times "t" within one time period of the microwave, "T". It is clearly visible that the direction of the electrical field vector shows the desired variation in direction over time.

Figure 8:
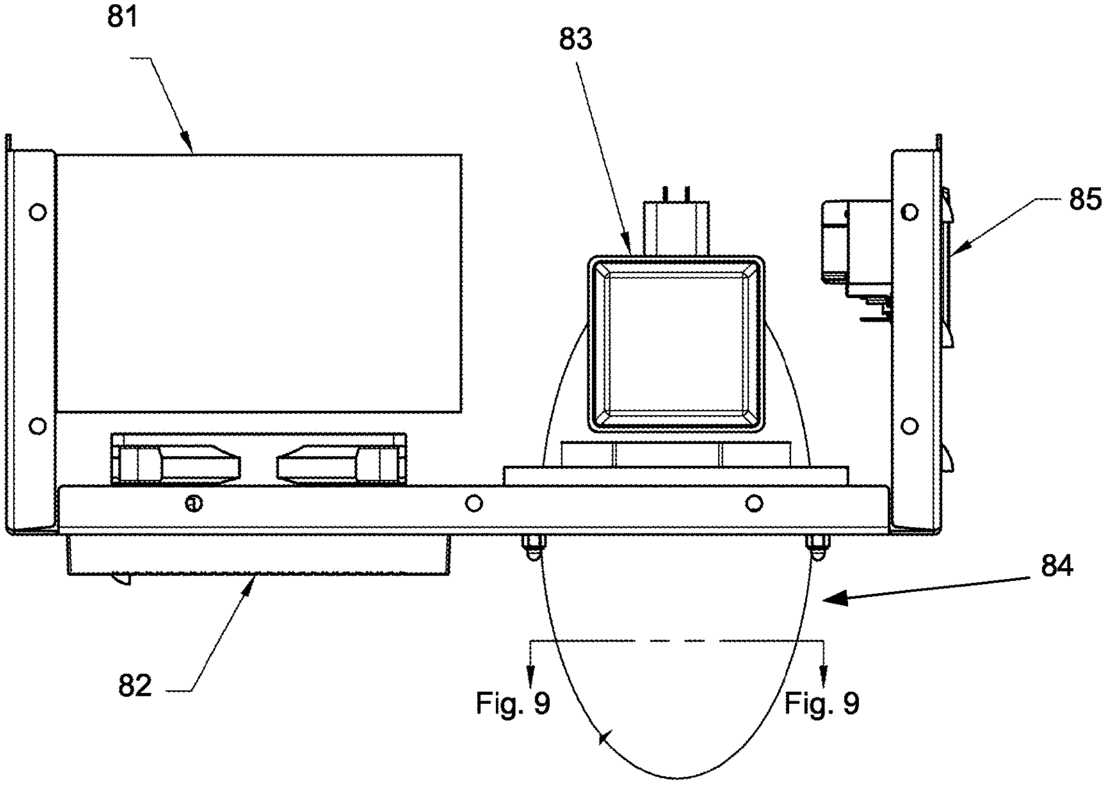
FIG. 8 is a diagram of one embodiment of a plasma lamp using the plasma light engine of the present invention.
Figure 9:
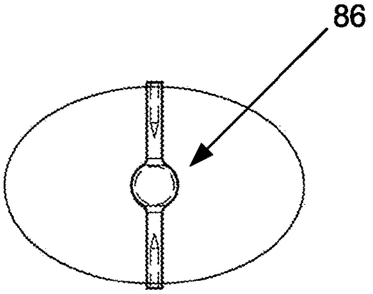
FIG. 9 is a top view of the plasma lamp shown in FIG. 8.

FIGS. 8 and 9 are block diagrams of the plasma light engine of the present invention implemented in one embodiment of a lamp structure. The lamp structure includes a Power Supply 81, Cooling Fan 82, Magnetron 83, Cavity 84, Power 85 and Bulb 86. FIG. 9 is a top view of Bulb 86.

The cavity 84 in this embodiment of the invention has an ellipsoidal shape containing the light Bulb 86. The ellipsoidal shape of the cavity together with the microwave feeding of the magnetron 83 results in the desired nearly circular polarization of the electromagnetic fields inside the light Bulb 86.

A further advantage over state-of-the-art solutions is the smooth geometry of the Cavity 84 without sharp edges. This results in nearly parallel surfaces of the bulb and the cage at least over the front hemisphere with the major light emission part of the lamp. Thus, effects of changing transmittance of the cage grid with angle of transmission are minimized, delivering higher luminescence yield and a better uniformity of the light engine.

Furthermore, the Bulb 86, which doesn't need to be rotated, can be mounted with 2 small pins to the side of the elliptical cage 84. There is no need of a long and massive mounting post which is needed as rotational axis in other solutions. This old single-side construction is much more sensitive to damage by shock and vibrations. Additionally, a long massive dielectric post along the longitudinal axis of the case introduces undesirable field distortions in the cavity.

In keeping with current trends of remote monitoring and control in the age of the Internet of Things (IoT), it is anticipated that some embodiments of the present invention will be provided with an electronic control box for monitoring the performance of the plasma light engine of the present invention, and/or the lamp structure in which the engine is integrated, and relaying certain performance parameters to a remote location. Such a refinement is especially important given that many applications of the light engine will be in places where they may not be readily accessible for maintenance, monitoring and control. In fact, many applications will require a wide array of a plurality of plasma light engine driven light sources, for example to illuminate an outdoor growing field or an indoor greenhouse. A central control panel in communication with each individual light engine and/or its host apparatus greatly simplifies their monitoring and control.

Figure 10:
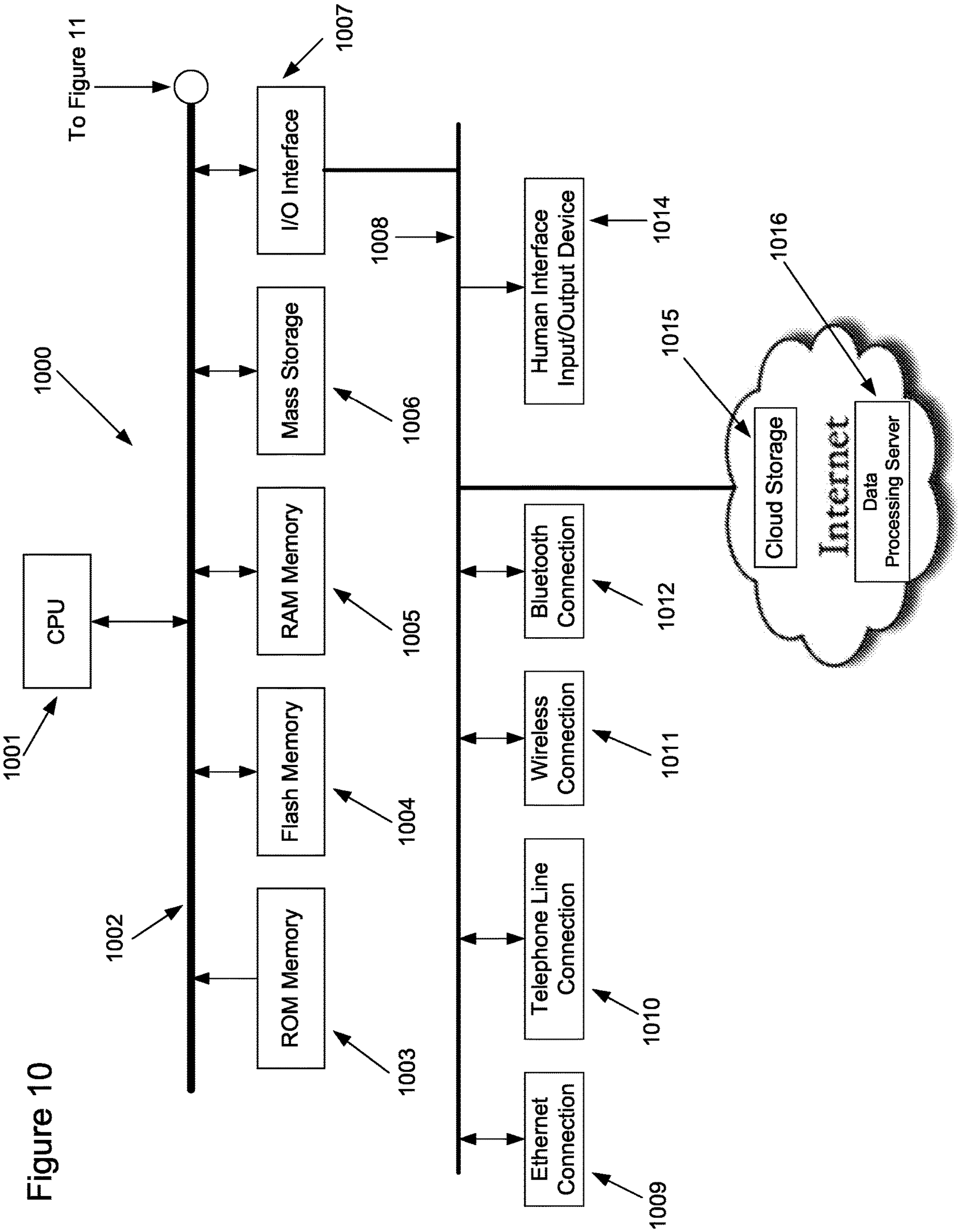
FIG. 10 is a block diagram of one embodiment of a control unit for the present invention.

FIG. 10 is a block diagram of one embodiment of an electronic Control Unit 1000 which can be used to control the plasma light engine of the present invention and/or its host apparatus.

As illustrated in FIG. 10, Control Unit 1000 includes a CPU 1001 which is used to execute computer software instructions as is known in the art. CPU 1001 is coupled, via buss 1002, to ROM Memory 1003, Flash Memory 1004, RAM Memory 1005, Mass Storage 1006 and I/O Interface 1007.

ROM Memory 1003 and Flash Memory 1004 may be used to store computer software instructions for execution by CPU 1001. RAM memory 1005 may also be used for storing computer software instructions, and especially for storing information that is only needed for a short period of time. Mass Storage 1006 is used for longer and larger data storage, especially in remote locations where the data cannot be transferred to a central data collection and storage space, such as Cloud Storage 1015 on the Internet, in real time for processing and analysis, such as by Data Processing Server 1016, also on the Internet.

The underlying firmware or software which CPU 1001 executes may be updated from time to time in order to correct programming errors or to add additional features to the system. Such upgrades can be accomplished locally at the physical location of Control Unit 1001 via Human Interface Input/Output Device 1014 and, or over an external communications port such as Ethernet Connection 1009, Telephone Line Connection 1010, Wireless Connection 1011 or Bluetooth Connection 1012.

Mass Storage 1006 may also implement a data logging function of the operation of the system which can be stored in Ram memory 1005 as well as be retained by Mass Storage 1006, or transferred to Cloud Storage 1015, for later retrieval over the above-mentioned communication ports.

The logging data may also be analyzed and modeled with analytic software resident on Data Processing Server 1016. Such analysis and modeling can be used to gain insights regarding the state and operating condition of one or more of the plasma light engines and its host apparatus, individually, or as an array, both as to the system itself as well as its ambient lighting condition. The data may also be used in a number of other ways, such as generating ambient light maps and other uses.

When the system of the present invention is deployed throughout a wide area, analysis of the data from each light engine and system as a whole becomes particularly meaningful and can be used, for example, to provide for more uniform lighting over a wide service area that might be susceptible natural light variations in some areas. This is particularly true when some amount of natural light is available and the light engine driven system of the present invention is used to supplement the available natural light in order to maintain a uniform and constant high quality light coverage. Thus, in an outdoor application, each system, or bank of systems, can be controlled to provide more or less intensity as the sun transitions to dusk, then to nightfall and then to morning light.

Even in an indoor environment, where natural light is not available, autonomous control of one or more light engine driven systems is desirable depending on, for example, the purpose of the illumination. For example, not all plants rely on the same degree of light exposure in order to grow. Overexposing a plant to light, while perhaps not being detrimental to the plant, would be a waste of electrical energy required to power the light system. Thus, being able to tailor the level of exposure provides many benefits, if not at the individual light system level, then surely at the light system bank level. Control unit 1001 allows such tailoring to take place.

As shown in FIG. 10, CPU 1001 is also coupled to a number of peripheral interface devices via I/O Interface 1007 and its own buss 1008.

Ethernet Connection 1009, Telephone Line Connection 1010, Wireless Connection 1011 and Bluetooth Connection 1012 allow Control Unit 1001 to communicate with remotely located devices and systems, for example the Internet and Cloud Storage 1015 and Data Processing Server 1016.

Bluetooth 1012 enables Control Unit 1000 to connect to and communicate with Bluetooth devices such as a smartphone. An app running on a smartphone may be used to receive and display all or a predetermined subset of the aforementioned logging data or any other date stored within the system. The app may, for example, also perform certain control functions to configure or reconfigure a light system as needed.

Human Interface Input/Output Device 1014 allows a human to communicate with Control Unit 1001 directly. Thus, the Device 1014 may include a visual display, status and warning lights and alarms. It may also include settable switches, push buttons and a keyboard as well as other such input/output devices.

The software and firmware resident in ROM 1003, Flash Memory 1004 and/or Ram Memory 1005 may also include maintenance and diagnostic functions for managing a particular light engine, or an entire system of light engines and their host apparatus, locally and remotely.

Light communication protocols like DMX, Dali etc., may also be used in connection with control unit 1000.

Figure 11:
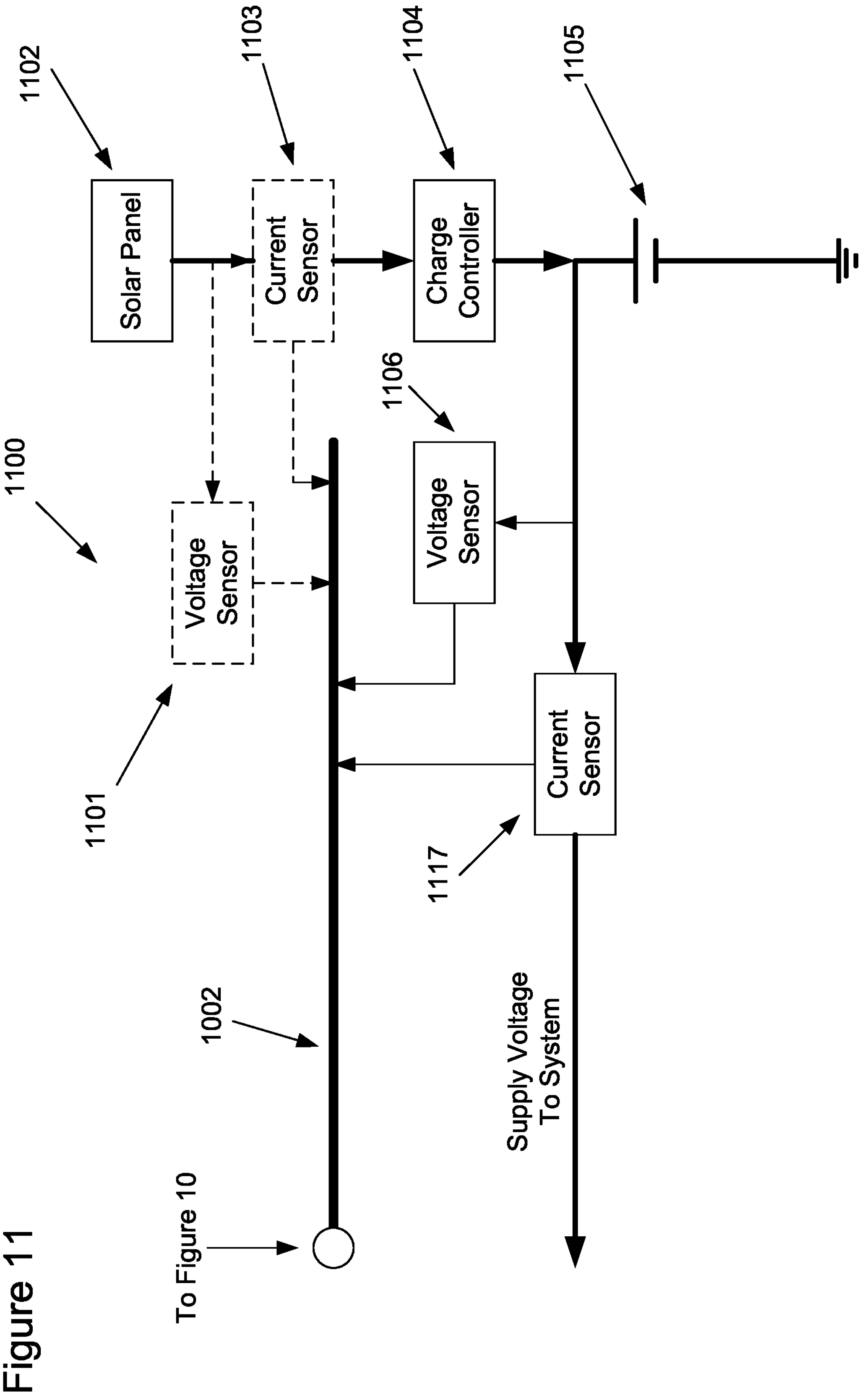
FIGS. 11 and 12 are block diagrams of one embodiment of a power supply for the present invention.

The Control Unit 1000 is powered by a Power Supply 1100 as illustrated in FIG. 11.

Power Supply 1100 may include a Solar Panel 1102 which supplies electrical power to a rechargeable Battery 1105 through Charge Controller 1104. Electrical power is then suppled to the system from Battery 1105. Current Sensor 1107 and Voltage Sensor 1106 can be used to monitor the level of current flow and voltage delivered by Battery 1105 to the system. This information is proved to CPU 1001 (FIG. 10) via BUS 1002 and can be part of the logged data referred to above.

Voltage Sensor 1101 and Current Sensor 1103 may also be provided to monitor and report the voltage and current levels from Solar Panel 1102 for logging and analysis purposes in a similar manner.

Figure 12:
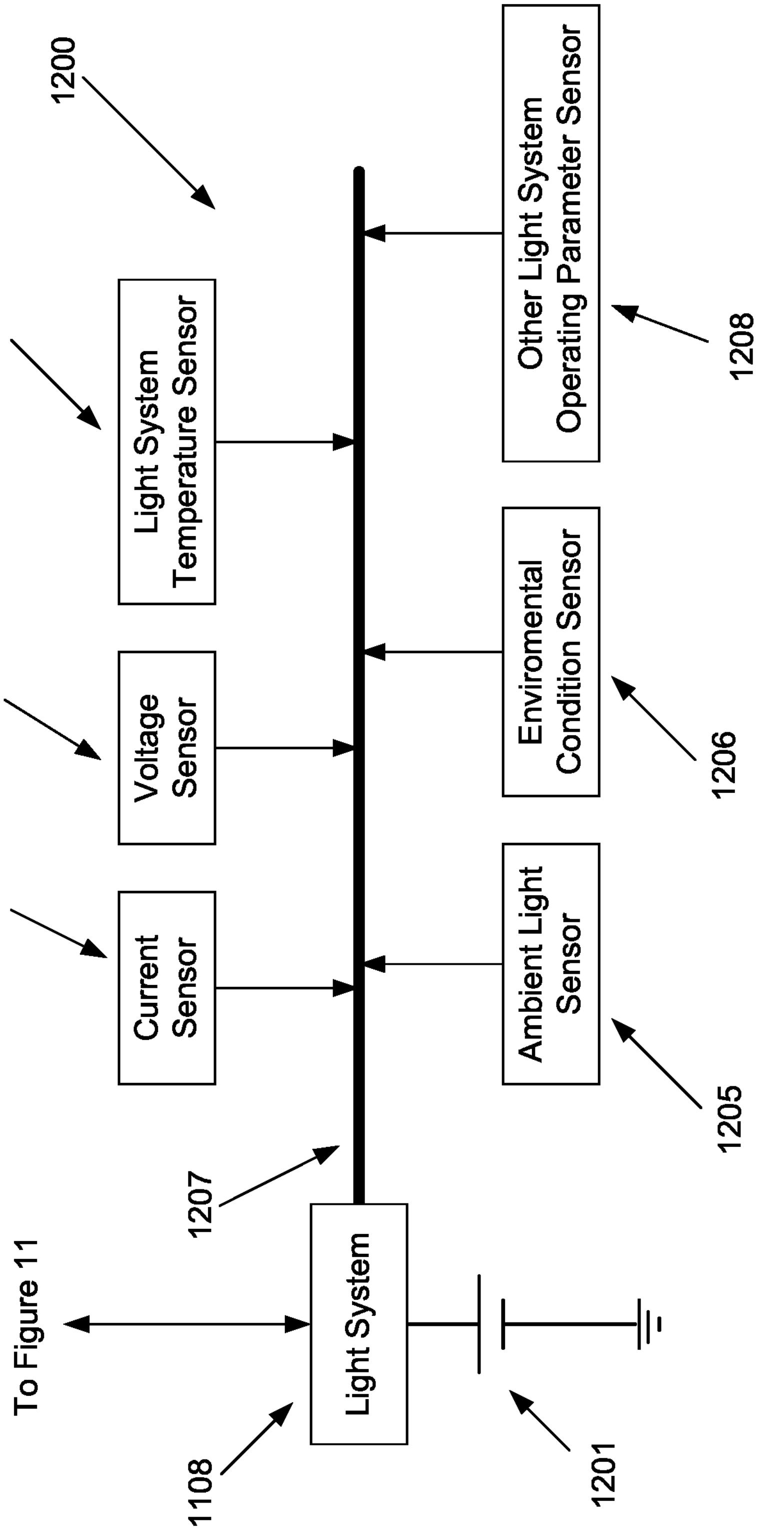

In the embodiment of Plasma Light System 1200 as shown in FIG. 12, a plurality of sensor 1202-1206 are provided which measure various parameters such and light system operating current and voltage, temperature, ambient light level and various environmental conditions. Other Plasma Light Engine Operating Parameter Sensor 1208 is provided as well.

With reference again to FIG. 10, Control Unit 1000 may be implemented using a number of computer devices, include a Raspberry Pi, an Arduino computing device, a Beagle Board and a number of similar devices as are known to those of ordinary skilled in the art. The skilled artisan would also know and understand how to program such devices in order to achieve the present invention.

Figure 13:
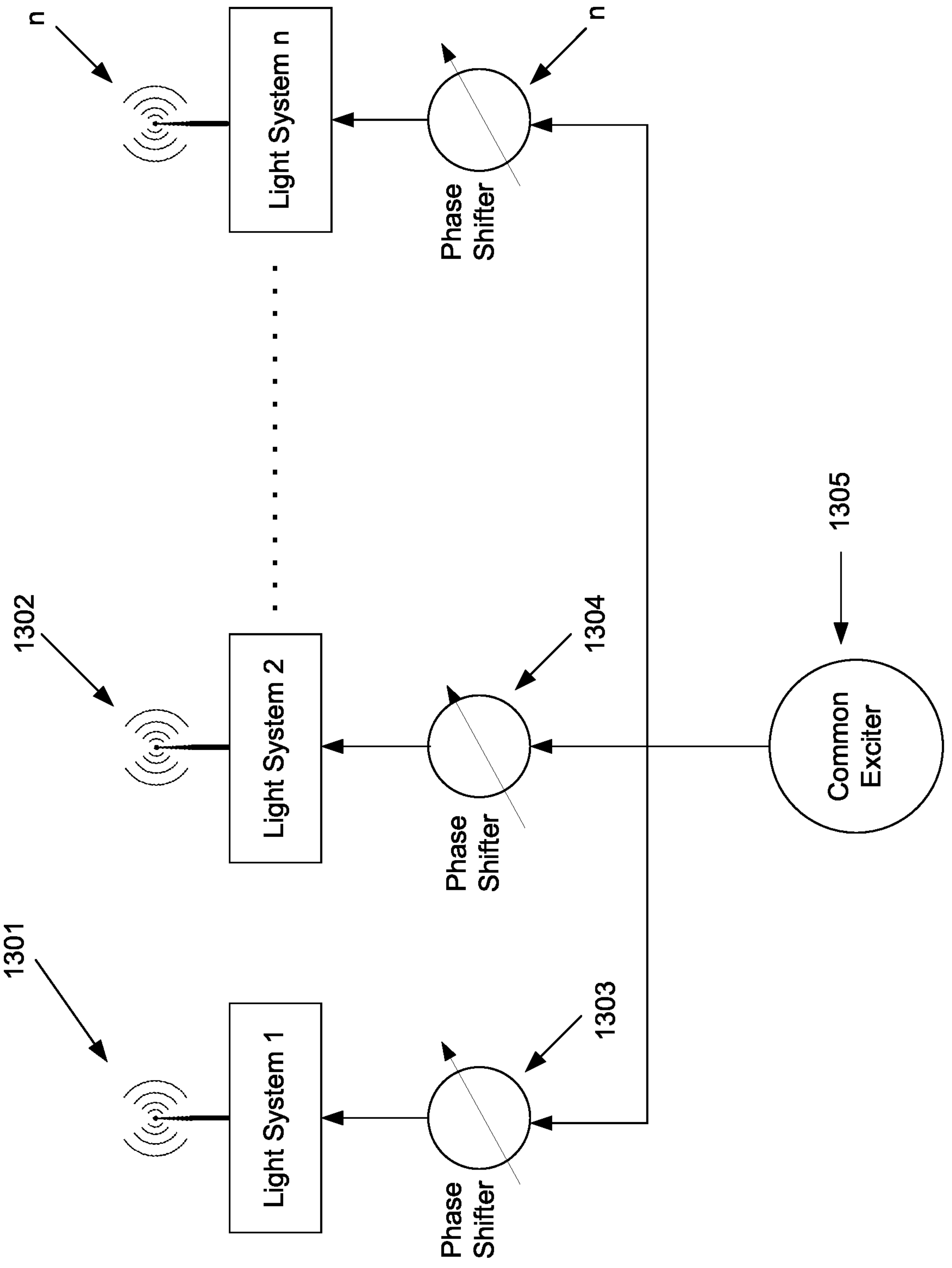
FIG. 13 illustrate one embodiment in which the present invention can be deployed.

FIG. 13 illustrates one embodiment of a deployment of a plurality of Plasma Light Engines 1 through n in accordance with the present invention where each engine can operate autonomously as explained above. In this embodiment, each Plasma Light Engine can communicate to remote data collection and control systems via a wireless connection as indicated by Wireless Connection 1011 or Bluetooth Connection 1012 as shown in FIG. 10.

To avoid electromagnetic interference, multiple light sources can be synchronized in frequency using a common exciter 1305 and phase shifters 1303, 1304 through n which provides a single microwave frequency to which all light sources are synchronized. This reduces possible multiple interfering frequencies to one single frequency which is much less harmful. Additional phase shifters can be used to optimize decoupling of the light engines and reduce electromagnetic field strengths at particular locations in the operation region.

Each Plasma Light Engine or system has a unique identification so that the data that is transferred to the Control Unit 1000 can be identified as coming from a particular Plasma Light Engine or system. The system may be arranged in a number of network topologies, including mesh networks as are understood by those of ordinary skill in the art. Thus, each system may be arranged to connect to other system and cooperate with one or all in order to rapidly and efficiently transfer data between Light Control Unit 1000.

Figure 14:
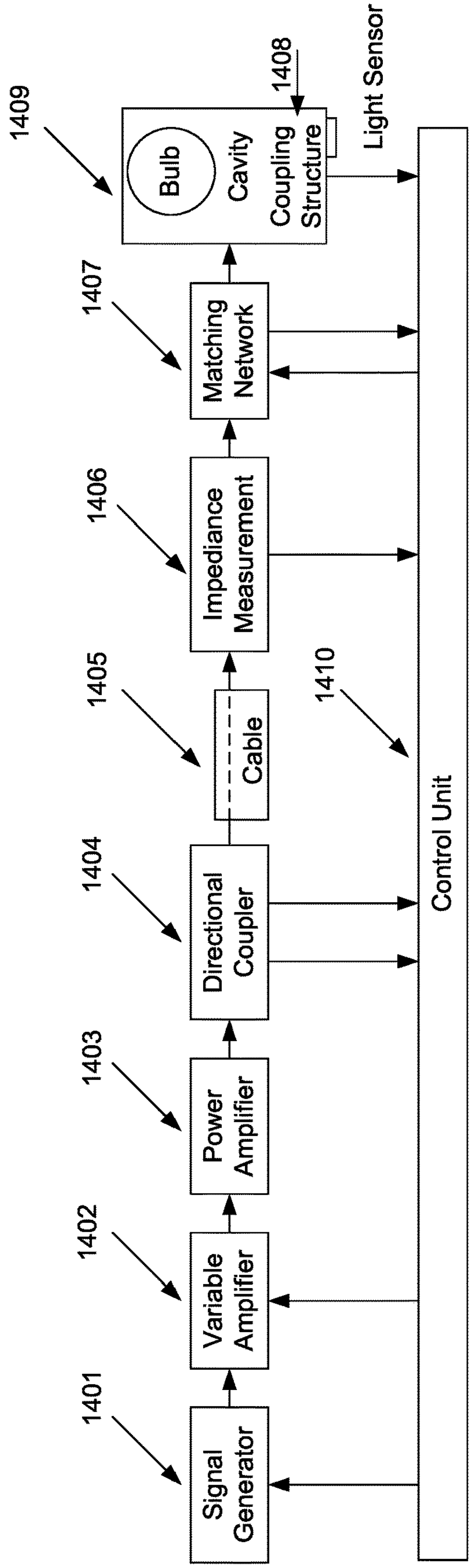
FIG. 14 is a block diagram of one embodiment of a discrete amplifier instead of a magnetron as shown in FIG. 8.

FIG. 14, shows an embodiment of the invention using a discrete amplifier instead of a Magnetron shown in FIG. 8. It can for example consists of:

- a signal generator 1401 which is preferably controllable in frequency, which can be realized for example by a voltage-controlled oscillator (VCO) or a digital synthesized signal source;
- a variable amplifier 1402 which gain can be externally controlled for power adjustment or modulation;
- a power amplifier 1403 which could be a tube amplifier using triodes, tetrodes or pentodes or a solid-state amplifier using for example silicon power devices (bipolar, MOSFet, CMOS) or compound semiconductors like Gallium Nitride (GaN), Silicon Carbide (SiC), Gallium Arsenide (GaAs), Indium Phosphide (InP) or similar devices or Carbon-based semiconductors. Drain voltage can be controlled for higher efficiency in partial load or amplitude modulated operation;
- a directional coupler 1404 to measure the incident and reflected wave amplitude at the power amplifier output for matching and delivered power control;
- A cable 1405 for connection with the cavity system. This can be a coaxial cable or a waveguide structure. In integrated systems, this cable will be quite short, but it's possible to separate the power generation system from the cavity system geometrically, in this case the microwave cabling can have a length up to 100 m and more. Thus, the electronic components can be located in a separate room with controllable environmental conditions id the light source itself needs to be operated under harsh conditions (humidity, temperature, dirt) when operated for example in open air or in greenhouses;
- A coupling structure 1408 inside the cavity 1409. This can be a coupling post, a coupling loop or a waveguide structure.
- A matching network 1407 to match the impedance of the coupling structure to the characteristic cable impedance, if necessary. The matching network can be fixed or variable. If carriable, it can be manually adjustable or remotely controllable. In the latter case, an impedance measurement sensor 1406 can be used to obtain tuning information for an automatic matching.
- A control system 1410 for adjustment and supervision of the systems operation. Controlling start-up procedure, making sure that the amplifier is operated within the specified limits, ensure plasma ignition, check of the impedance and matching parameters, etc.

Figure 15:
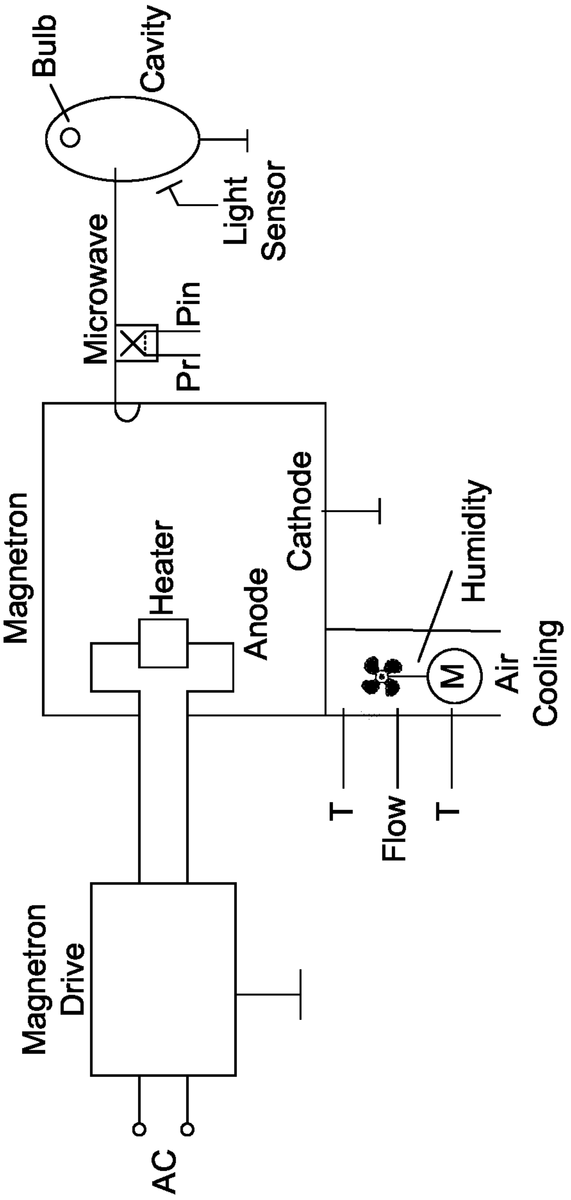
FIG. 15 is a block diagram of a further embodiment of a plasma light engine implementation according to the present invention.

The present invention can be used with ISM frequencies and other frequencies outside the ISM band. Magnetrons as shown in FIGS. 8 and 15 are available typically for ISM frequencies, for this application the 433.05-434.79 MHz, 886 MHz-906 MHz, 2.400 MHz-2,500 MHz, 5.725 MHz-5.875 MHz are preferable. With discrete amplifiers as shown in FIG. 14, all other frequencies can be used too, depending on the rules and regulations valid at the location of operation.

Using the ISM band between 2.400 MHz and 2.500 MHz, it would be useful to avoid the WLAN frequencies 2.401 MHz-2.495 MHz and the Bluetooth frequencies 2.400 MHz-2.4835 MHz to minimize interference with those communication systems, using only the frequency band 2.495 MHz-2.500 MHz to realize this small band of 5 MHz bandwidth, a solid-state synthesized signal source (FIG. 14) would be preferable over magnetrons (FIGS. 8 and 15), which can hardly be controlled that accurately.

The microwave power can be pulsed or modulated. Pulsing allows tuning of the spectral characteristics of the light emission, the efficiency and the stability of the light emitting plasma for various power levels. The average power can be controlled independent of the peak plasma rf energy density. Recombination effects of the plasma after power drop can be used for optimization. It is clear that in pulsed operation the average light generating power level is below the maximum power capability of the microwave supply. Modulations can be applied with arbitrary frequencies and waveforms, for example sine, rectangle, triangle. The effect of modulation frequency is correlated with time constants of the plasma (plasma frequency, recombination times, ignition time).

FIG. 15 is a block diagram of a further embodiment of a plasma light engine implementation according to the present invention. This embodiment the Magnetron-driven system contains a Magnetron drive Supply to convert AC supply voltage into Magnetron anode high voltage and low power Heating voltage, the magnetron to convert anode voltage into microwave energy and the cavity, in which the microwave energy is coupled to ignite the plasma in the bulb. The magnetron needs forced air or water cooling.

The following measurements and sensors can be included as well:

- Anode voltage;
- Anode current;
- Heater voltage;
- Heater current;
- Microwave incident wave amplitude;
- Microwave reflected wave amplitude;
- Light emission from Bulb;
- Air cooling flow;
- Air cooling inlet temperature;
- Air cooling outlet temperature; and
- Humidity.

In accordance with the present invention, a possible sequence of operation is:

- Check of supply voltage;
- Switch on air cooling fan;
- Check cooling air flow;
- Check cooling air inlet temperature;
- Check cooling air outlet temperature;
- Switch on Magnetron heater;
- Check heater voltage and heater current;
- Wait until cooling air temperature reaches a desired value, preferably above dew point with some spare. This pre-heating of the system removes condensed water inside the system which can result in high voltage (DC or microwave) flashovers at microwave start. Measurements from an additional humidity sensor can be added in this procedure. This is in particular important if the system is operated in locations with high humidity levels which can exceed dew point and cause condensed water;

Switch on anode voltage on a defined ignition level, developed by previous experiments;

Check plasma ignition by light sensor and or by microwave incident and reflected power measurements;

Ramp anode voltage to desired power (setpoint);

Continuous check and control of anode voltage, anode current, anode power, microwave incident power and microwave reflected power;

Continuous check of heater voltage and heater current:

End of magnetron lifetime check by comparing heater power with anode power;

Increase heater power even above specification at end of magnetron lifetime;

Decrease heater power even under specification with a new magnetron which still has spare emissivity or which is used below maximum power to extend lifetime of magnetron;

Switch off anode power;

Switch off heater;

Switch off fan after cooling time; and

Wait time for re-ignition until the solid parts of the light bulb filling are condensed again (a few minutes).

While the foregoing specification teaches the principles of the present invention, with examples provided for the purpose of illustration, it will be appreciated by one skilled in the art from reading this disclosure that various changes in form and detail can be made without departing from the true scope of the invention.

We claim:

1. A plasma light with at least one non-rotating light bulb, comprising of at least one conducting cavity structure with at least one radiation source input port and at least one light bulb, and at least one cavity, where the geometry of the cavity and/or cavities is designed to generate electrical fields with time-dependent geometrical designed orientation within at least parts of the light bulb while the direction of the radiation fields from at least one radiation source port caused by a microwave generator to the input port fields is stationary.

2. The plasma light according to claim 1, wherein said light bulb is electrodeless.

3. The plasma light according to claim 1, wherein said light bulb is non-rotating.

4. The plasma light according to claim 1, wherein said light bulb is rotating.

5. The plasma light according to claim 1, further including a bulb, wherein said bulb is circular, elliptical, faceted and/or customized for specific applications.

6. An electrodeless plasma light having a non-rotating light bulb, said plasma light comprising:

conducting cavity structure defined by:

a microwave input port;

at least one light bulb; and at least one cavity, wherein the geometry of said cavity is designed to generate electrical fields with time-dependent geometrical designed orientation within at least parts of the light bulb while the direction of the radiation fields from at least one radiation source port caused by a microwave generator to the input port fields is stationary.

7. The plasma light according to claim 1, wherein said plasma light produces a polarization that is selected from the group consisting of conical, circular, elliptical and customized polarizations.

8. The plasma light according to claim 1, wherein the operating frequency of said plasma light is based on the specific application of said plasma light.

9. The plasma light according to claim 1, wherein the operating frequency of said plasma light is between 100 MHz-100 GHz region.

10. The plasma light according to claim 7, where the operating frequency of said plasma light is adjustable based on the application of said plasma light.

11. The plasma light according to claim 1, wherein said plasma light further includes a customizable waveguide depending on the particular application of said plasma light.

12. The plasma light according to claim 1, wherein said plasma light further include a customizable antenna depending on the particular application of said plasma light.

13. The plasma light according to claim 1, wherein the resultant radiating loop of said plasma light is customized depending on the particular application of said plasma light.

14. The plasma light according to claim 1, wherein said plasma light uses a magnetron as its source of radiation.

15. The plasma light according to claim 1, wherein said plasma light uses a solid-state device as its source of radiation.

16. The plasma light according to claim 1, wherein said electrodeless bulb is filled with material(s) not compatible with metallic electrodes, that produces a variety of spectra, including, spectra that emulate sunlight and a plurality of customized light, energy, wavelength and frequency spectra.

17. The plasma light according to claim 1, further including an electrodeless bulb, wherein said bulb is circular in shape.

18. The plasma light according to claim 1, further including an electrodeless bulb, wherein said bulb is tubular in shape.

19. The plasma light according to claim 1, wherein said plasma light uses a cavity that is conductive to radiation and is transparent to light.

20. The plasma light according to claim 19, wherein said cavity is solid.

21. The plasma light according to claim 19, wherein said cavity is a metallic mesh structure.

22. The plasma light according to claim 19, wherein said cavity is a transparent material coated with a conducting thin film coating.

23. The plasma light according to claim 19, wherein a portion of said cavity is solid metallic and can be used as part of and/or an entire reflector.

24. The plasma light according to claim 1, wherein said plasma light further includes filtering to produce a variety of spectra.

25. The plasma light according to claim 24, wherein said plasma light further includes filtering to produce electromagnet spectra that emulates sunlight.

26. The plasma light according to claim 24, wherein said filtering is formed of thin film layers structures.

27. The plasma light according to claim 24, wherein said filtering is formed of various shapes that are circular, elliptical, faceted and/or customized for specific applications.

28. The plasma light according to claim 1, wherein the radiation source may be rotated around a stationary bulb with a network of radiation sources.

29. The plasma light according to claim 28, wherein said network is a matched network.

30. The plasma light according to claim 1, wherein said plasma light further includes rotation means for the radiation source around a stationary bulb with matched network of radiation sources.

31. The plasma light according to claim 1, where no parts of the bulb fixture are located between the bulb and the electromagnetic wave source, so that seen from the direction of the source of the electromagnetic waves all means for bulb fixture ale located sideways of the bulb or behind the bulb.

32. The plasma light according to claim 21, wherein said metallic mesh structure consists of 2 layers separated by a distance.

33. The plasma light according to claim 1, where the position of the light bulb is adjusted to minimize the reflected wave ratio in the waveguide connecting the bulb to the microwave source to obtain maximum and optimum microwave power in and to the bulb.

34. The plasma light according to claim 33, where the light bulb can be moved manually or automatically.

35. The plasma light according to claim 1, where the light bulb is mounted in the cage by at least two dielectric posts extending from the bulb to the cage which are positioned orthogonal to the axis of the cage between bulb and magnetron.

* * * * *